United States Patent

Flaherty et al.

[15] 3,673,860
[45] July 4, 1972

[54] NON-DESTRUCTIVE TESTING SYSTEM HAVING PATTERN RECOGNITION MEANS

[72] Inventors: John J. Flaherty, Elk Grove Village; Henry N. Nerwin, Mount Prospect, both of Ill.

[73] Assignee: Magnaflux Corporation, Chicago, Ill.

[22] Filed: Nov. 10, 1969

[21] Appl. No.: 875,304

[52] U.S. Cl. .................. 73/67.9, 250/71.5 S, 250/83.3 D, 250/219 DF, 356/237
[51] Int. Cl. ............................................. G01n 29/04
[58] Field of Search ............................ 73/67.5–67.9; 343/5 MM; 340/1; 250/219 DF, 71.5 S, 83.3 D; 356/200, 237

[56] References Cited

UNITED STATES PATENTS 3,077,107 2/1963 Henry ........................... 73/67.8
3,416,364 12/1968 Wycherley et al. ............ 73/67.8

FOREIGN PATENTS OR APPLICATIONS

736,464 9/1955 Great Britain .................. 73/67.9

Primary Examiner—Richard C. Queisser
Assistant Examiner—John P. Beauchamp
Attorney—Hill, Sherman, Meroni, Gross & Simpson

[57] ABSTRACT

Non-destructive testing system in which patterns of defects indications, having one or more predetermined configurations, can be indicated rapidly and automatically. Defect indications are registered, preferably in a shift register matrix, and the registered indications are scanned to detect a pattern having a particular configuration, preferably by shifting the indications to a second shift register matrix to which scanning signals are applied. The system is operative to detect any pattern having a particular configuration regardless of its position in the registered indication and the pattern scanning can be carried out simultaneously with scanning of a part. The system may include ultrasonic test means operative in a B-scan mode or a C-scan mode, but other types of non-destructive testing means can be used.

11 Claims, 15 Drawing Figures

INVENTOR
JOHN J. FLAHERTY
HENRY N. NERWIN
BY
ATTORNEY

INVENTOR
JOHN J. FLAHERTY
HENRY N. NERWIN
BY
ATTORNEY

NON-DESTRUCTIVE TESTING SYSTEM HAVING PATTERN RECOGNITION MEANS

This invention relates to a non-destructive testing system having pattern recognition means and more particularly to a system in which a pattern having a particular configuration can be rapidly recognized automatically. The system is highly reliable and also very versatile.

Ultrasonic and other types of non-destructive testing systems have the capability of locating defects of various types some of which may render a part unsatisfactory for use or for further manufacturing operations and others of which may not be objectionable in the particular part being tested. It is possible to analyze indications obtained to determine whether particular objectionable types of defects exist. However, with prior systems, the analysis of indications has required a highly skilled operator and considerable time. Where a series of parts are inspected, operator fatigue becomes a serious problem, often times resulting in the passing of defective parts or the rejection of satisfactory parts.

This invention was evolved with the general object of overcoming the disadvantages of prior systems and of providing a system in which particular types of defects can be indicated rapidly and automatically.

A more specific object of the invention is to provide a non-destructive testing system with pattern recognition means operable with a high degree of reliability while being very versatile.

According to this invention, means are provided for registering an indication of the character of a test piece with patterns in the registered indication having configurations and positions corresponding to the configurations and positions of inhomogeneities in the test piece while means are provided for detecting patterns in the registered indication having a particular configuration.

In accordance with an important feature, the pattern sensing means includes means for effecting scanning of the registered indication to detect any pattern having a particular configuration irrespective of its position in the registered indication.

According to a specific feature of the invention, the defect indications are registered in a shift register matrix and the registered indications are then scanned to detect a pattern having a particular configuration. Preferably, the registered indications are shifted to a second shift register matrix to which signals are applied to effect scanning and to permit a read-out of a pattern having a particular configuration. In one preferred read-out arrangement, lamps are energized from stages of the shift register matrix and photocells are positioned to detect a pattern having a particular configuration. In another arrangement, one or more AND gates are used, connected to particular stages of the shift register matrix.

The registration of the indication of the character of the test piece is preferably accomplished by scanning in two mutually transverse directions with the scanning movement in one direction being at a high speed relative to the scanning movement in the other. In one type of system, an ultrasonic transducer is moved back and forth in one direction relative to the part and at a relatively rapid rate while moving relative to the part in a transverse direction, during or between movements in the one direction, thus accomplishing a C-scan. In another arrangement, an ultrasonic transducer is pulsed and the scanning in one direction is accomplished by responding to the timing of echo pulses, thus operating in a B-scan mode. It will be appreciated, of course, that other forms of non-destructive testing means may be employed.

A still further feature of the invention is in the synchronization of the operation of the means for scanning the part and the means for scanning registered indications in a manner such as to obtain a rapid read-out and to permit inspection at a rapid rate.

This invention contemplates other objects, features and advantages which will become more fully apparent from the following detailed description taken in conjunction with the accompanying drawings which illustrate preferred embodiments and in which:

Figure 1:
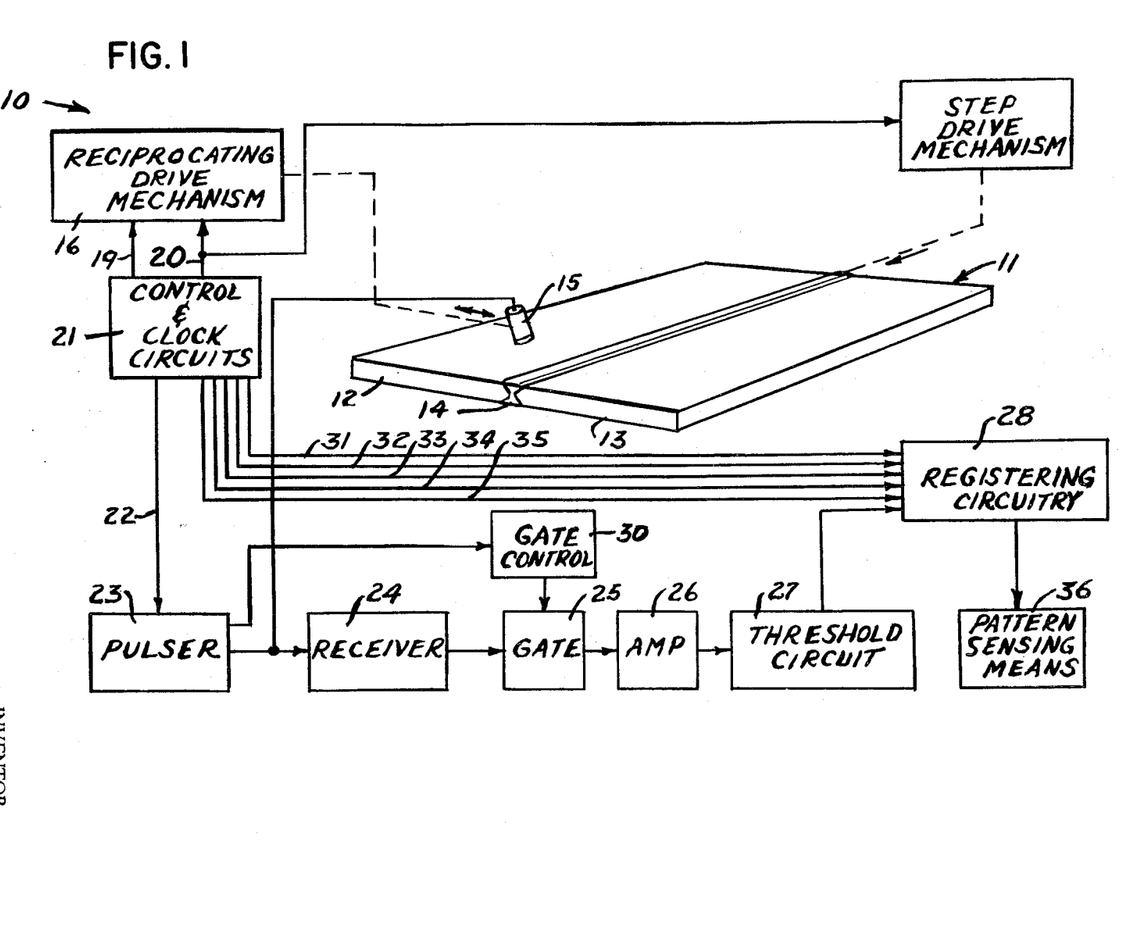
FIG. 1 is a schematic view of an ultrasonic weld testing system incorporating pattern recognition means and constructed in accordance with the principles of this invention.

Reference numeral 10 generally designates an ultrasonic weld testing system incorporating pattern recognition means and constructed in accordance with the principles of this invention. A part to be inspected, generally designated by reference numeral 11, is formed by joining two plates 12 and 13 with a weld 14 and the system is designed to test the soundness of the weld 14. For this purpose, an ultrasonic transducer 15 is arranged to transmit a narrow beam of ultrasonic energy into the surface of the plate 12 at a position spaced from the weld 14 at an angle such as to impinge on the weld directly or after reflection from the lower surface of the plate 12. Preferably, the part 11 and the transducer 15 may be immersed in a tank of water or other liquid, to provide an effective coupling of the ultrasonic waves.

The transducer 15 is moved back and forth in a direction transverse to the weld 14 by a reciprocating drive mechanism 16 while the part 11 is moved in the direction of the weld 14 by a step drive mechanism 17 so as to effect relative movement between the transducer 15 and the part 11 in a direction parallel to the weld 14.

Figure 2:
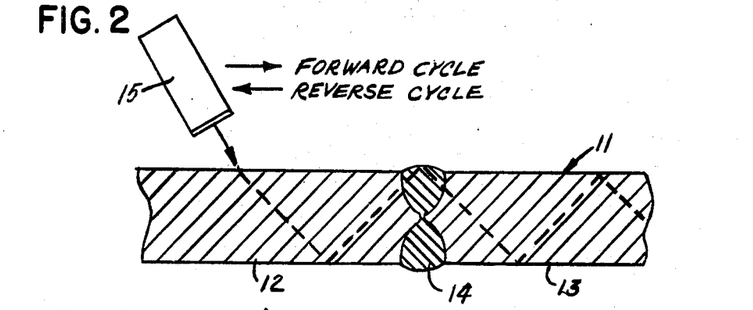
FIGS. 2, 3 and 4 are sectional views of a test piece and a weld therein, showing the manner of scanning of the weld.
Figure 3:
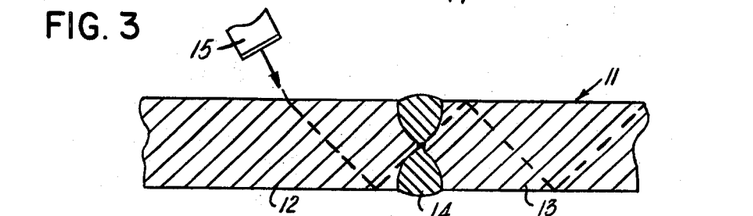
Figure 4:
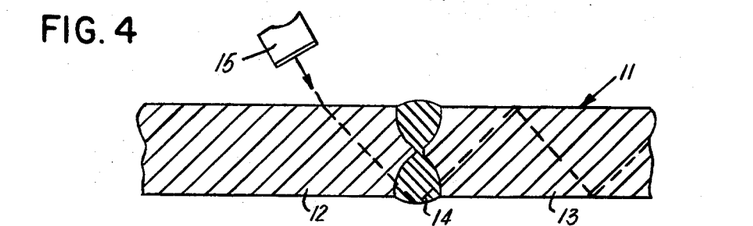

FIG. 2 illustrates diagrammatically the path of transmission of the ultrasonic energy when the transducer is at the limit of rearward travel thereof, away from the weld 14. As shown, the energy is transmitted to impinge on the lower surface of the plate 12 at an angle such as to reach the upper portion of the weld 14. Inhomogeneities of sufficient size in the weld 14 will cause reflection of ultrasonic energy back along the same path to reach the transducer 11 at a certain time after transmission of the energy. FIG. 3 shows the path of propagation of transmitted and reflected energy when the transducer 15 is at an intermediate position. In this case, the energy is impinged upon and is reflected from an intermediate point of the weld 14. FIG. 4 shows the path of propagation of transmitted and reflected energy when the transducer 15 is at the limit of its forward travel toward the weld 14. In this case, the energy is impinged upon and is reflected from a lower end portion of the weld 14. Thus by moving the transducer 15 between the positions shown in FIGS. 2 and 4, the entire cross-section of the weld 14 can be scanned.

Figure 5:
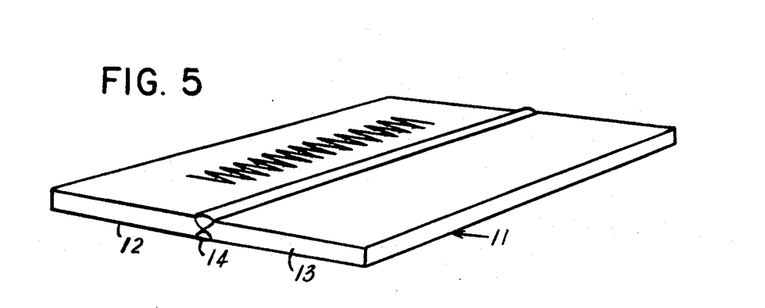
FIG. 5 is a diagrammatic illustration of the movements of a transducer relative to a test piece and a weld therein.

FIG. 5 illustrates diagrammatically the path of movement of the transducer 15 relative to the part 11 when both the reciprocating drive mechanism 16 and the step drive mechanism 17 are operative. In this case, the step drive mechanism 17 operates to index the part 11 during rearward travel of the transducer 15. It will be appreciated that the step drive mechanism 17 could be operated only between forward and rearward movements or continuously, if desired. The forward and rearward movements can be accomplished at linear rates or at non-linear rates, such as sinusoidally.

To control the reciprocating drive mechanism 16, forward and reverse signals are applied thereto through lines 19 and 20, from a control and clock circuit 21. Line 20 is also connected to the drive mechanism 17 to effect operation thereof during rearward movement of the transducer 15.

The control and clock circuit 21 also applies control signals through line 22 to a pulser 23 connected to the transducer 15. Echo signals developed by the transducer are applied to a receiver 24, a gate circuit 25, an amplifier 26 and a threshold circuit 27 to registering circuitry 28. The gate circuit 25 is controlled by a gate control circuit 30 which is controlled from the pulser 23 to open the gate circuit 25 during time intervals at which echoes might be expected from the weld 14.

Control signals are applied to the registering circuitry 28 through lines 31-35 and the registering circuitry 28 is connected to pattern sensing means 36 as diagrammatically indicated in FIG. 1.

Figure 6:
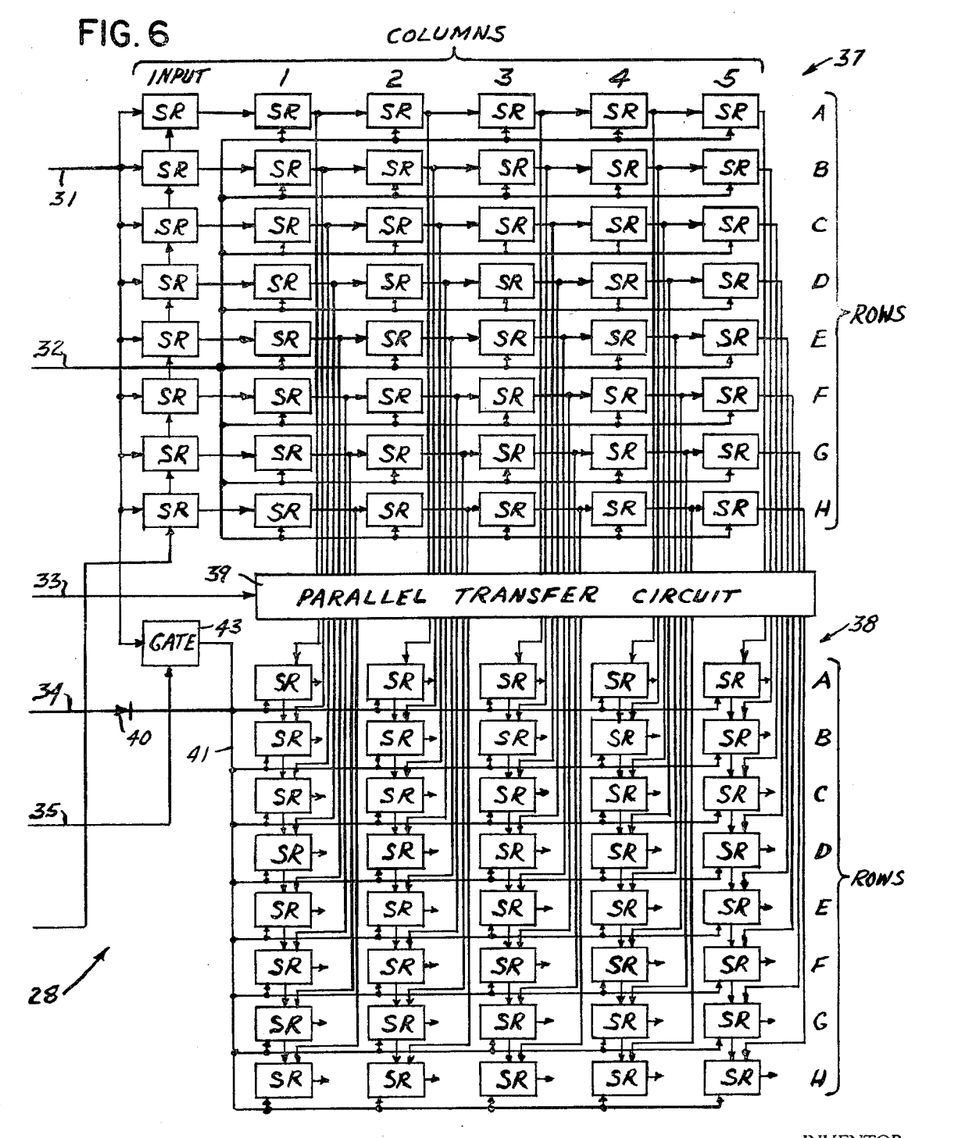
FIG. 6 is a schematic diagram of registering circuitry of the system of FIG. 1.

FIG. 6 is a schematic diagram of the registering circuitry 28. The circuit 28 includes a first matrix or grid of shift register stages, arranged in eight rows indicated by reference characters A-H and in six columns, the first being designated as an "INPUT" column and the remaining five columns being indicated by reference numerals 1-5. Thus the stage at the upper left may be designated as the "A-INPUT" stage, the stage immediately to the right therefrom may be designated as the "A-1" stage and so on. The upper matrix or grid of shift registers is generally designated by reference numeral 37. A second matrix or grid of shift registers is provided which is designated by reference numeral 38 and which has a configuration similar to that of the grid 37 but without the input column. The shift register stages of the second grid are connected to corresponding stages of columns 1 through 5 of the first grid through a parallel transfer circuit 39 which may comprise forty gate circuits operated when a control signal is applied through line 33.

Amplified echo signals having a magnitude greater than a certain threshold value are applied from the output of the threshold circuit 27 to the H-INPUT shift register stage to be stored therein when a clock signal is applied through line 31. At the same time, a signal previously stored in the H-INPUT stage is transferred to the G-INPUT stage, information previously stored in the G-INPUT stage is transferred to the F-INPUT stage and so on. A series of eight clock pulses are applied through the line 31 during the forward cycle, i.e., during forward movement of the transducer 15 toward the weld 14, the first clock pulse being applied at the start of the forward cycle and the last clock pulse being applied at the end of the forward cycle. Thus at the end of the forward cycle information will be stored in the input stages in accordance with the scanning of the weld from top to bottom. If an inhomogeneity exists only in the very top portion of the weld, a signal will be stored only in the A-INPUT stage. Similarly, if an inhomogeneity exists only in the very bottom portion of the weld, a signal will be stored only in the H-INPUT stage. If there is a crack in the weld extending from top to bottom, signals may be stored in all input stages.

The input stages of rows A-H are respectively connected to the column 1 stages of rows A through H. In a similar fashion, the column 1 stages are connected to the column 2 stages, the column 2 stages to the column 3 stages, the column 3 stages to the column 4 stages and the column 4 stages to the column 5 stages. Transfer or clock pulses are applied simultaneously to all stages of columns 1 through 5 through the line 32 to transfer stored signals from one stage to another. Thus, for example, upon application of a clock pulse to stage A-1, the information signal stored in the A-INPUT stage is transferred to the A-1 stage. Similarly, information stored in the A-1 stage is transferred to the A-2 stage.

A clock pulse is applied to the line 32 during the reverse cycle, i.e., during rearward movement of the transducer 15 away from the weld 14, at which time the drive mechanism 17 is operative to effect the indexing movement, i.e., relative movement between the transducer 16 and the part 11 in a direction parallel to the weld 14.

After application of a clock pulse on the line 32 to effect transfer of information from one column to another in the first grid 37, information is transferred from all stages of columns 1-5 of the first grid 37 to respective stages of columns 1-5 of the second grid 38. Such transfer is accomplished by applying a signal through line 33 to the parallel transfer circuit 39 and by applying, at the same time, a clock pulse from line 34 and through a diode 40 to a line 41, connected to all stages of the second grid 38. Thus during each reverse cycle and indexing movement, the entire pattern stored in the first grid 37 is transferred to the second grid 38.

The stages of each column of the second grid 38 are connected in cascade through isolation diodes or the like (not shown) to allow the transfer of information from one stage to another when additional clock pulses are applied to the line 41. Thus a signal stored in stage A-1 of the second grid 38 will be transferred to stage B-1, a signal stored in stage B-1 will be transferred to stage C-1, and so on. Such additional clock pulses are applied during each forward cycle and are derived from the line 31 through a gate 43 which is enabled by application of a control pulse on the line 35.

Figure 7:
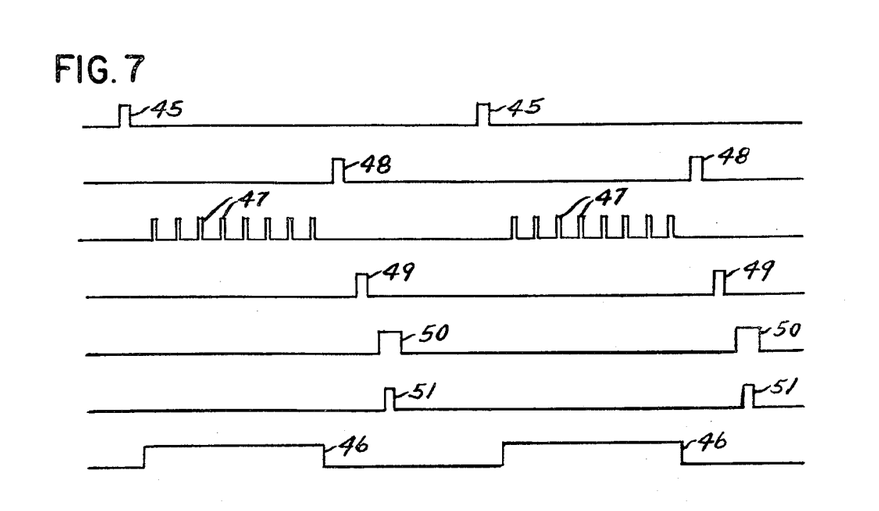
FIG. 7 is a schematic diagram showing the timing of signals applied to drive mechanisms and the registering circuitry.

FIG. 7 shows the relative timing of control and clock signals. First, a forward signal is applied through line 19 to the reciprocating drive mechanism 16 to initiate the forward cycle. Then a gate control signal 46 is applied on the line 35 to open or enable the gate 43 for a certain time interval. During that time interval, a series of eight clock pulses 47 are applied through the line 31 to the input stages of the first grid 37 and through the gate 43 to the line 41 to be also applied to all stages of the second grid 38. Such clock pulses cause signals to be shifted progressively upwardly through the stages of the input column of the grid 37 and, at the same time, such clock pulses cause signals transferred to the second grid 38 to be shifted downwardly from one stage to another, in each column thereof.

Next, a reversing and index signal 48 is applied through line 20 to initiate a rearward cycle of movement of the transducer 15 and to initiate an indexing movement by the step drive mechanism 17.

A clock pulse 49 is then applied to the line 32 to shift signals from the stages of the input column of the grid 37 to the stages of column 1 thereof, to shift signals from the stages of column 1 to the stages of column 2, and so on.

Next, a gate signal 50 is applied through line 33 to the parallel transfer circuit 39 and a clock pulse 51 is applied through line 34 and diode 40 to the line 41 to cause transfer of signals stored in the stages of columns 1-5 of the input grid 37 to the corresponding stages of columns 1-5 of the second grid 38. This completes the operation and another operation is initiated by applying another forward signal 45 to the line 19.

The operation of the system may be more clearly understood by considering its response to different types of defects in the weld 14. As one example, assume that a crack exists in the top portion of the weld having a length along the weld approximately equal to the distance of movement in five consecutive indexing operations. During the forward cycle when one end of the flaw is initially detected, a signal will become stored in the A-INPUT stage of the grid 37 and when the clock pulse 49 is applied, the signal will be transferred to the A-1 stage of the first grid 37. Upon application of the gate signal 50 and the clock pulse 51, the signal will be transferred to the A-1 stage of the second grid 38. During the next forward cycle the signal will be moved downwardly through the stages of column 1 of the second grid 38 to arrive at the H-1 stage after seven of the clock pulses 47. The eighth clock pulse will clear all stages of the second grid 38. Also during the eight clock pulses, another flaw signal will be entered into the H-INPUT stage of grid 37 and will be moved progressively upwardly to be stored in the A-INPUT stage. The next clock pulse 49 will then cause transfer of the signal from the A-

INPUT stage to the A-1 stage of grid 37 and transfer of a signal from the A-1 stage to the A-2 stage.

Following through this operation, it will be seen that after five consecutive operations, signals will be stored in stages A-1, A-2, A-3, A-4 and A-5 of the grid 37 which signals will be transferred to the corresponding A stages of the second grid 38, upon application of the gate signal 50 and the clock pulse 51. During the next subsequent forward operation, such signals will be transferred progressively downwardly through the stages of each column of the second grid 38 to arrive at the H stages after application of seven of the clock pulses 47.

If a similar longitudinal flaw exists along the lower portion of the weld 14, signals will also be stored in all five H stages of the second grid 38 at a time immediately following the parallel transfer operation in the fifth cycle. If a similar longitudinal flaw exists at an intermediate portion of the weld 14, signals will be stored in all five of the H stages during the sixth forward cycle and after application of three or four clock pulses.

Accordingly, if one wishes to determine whether a longitudinal flaw exists at any point of the weld which has at least a certain length, it can be determined by continual examination of the condition of the H stages as the operation proceeds.

Figures 8, 9, 10:
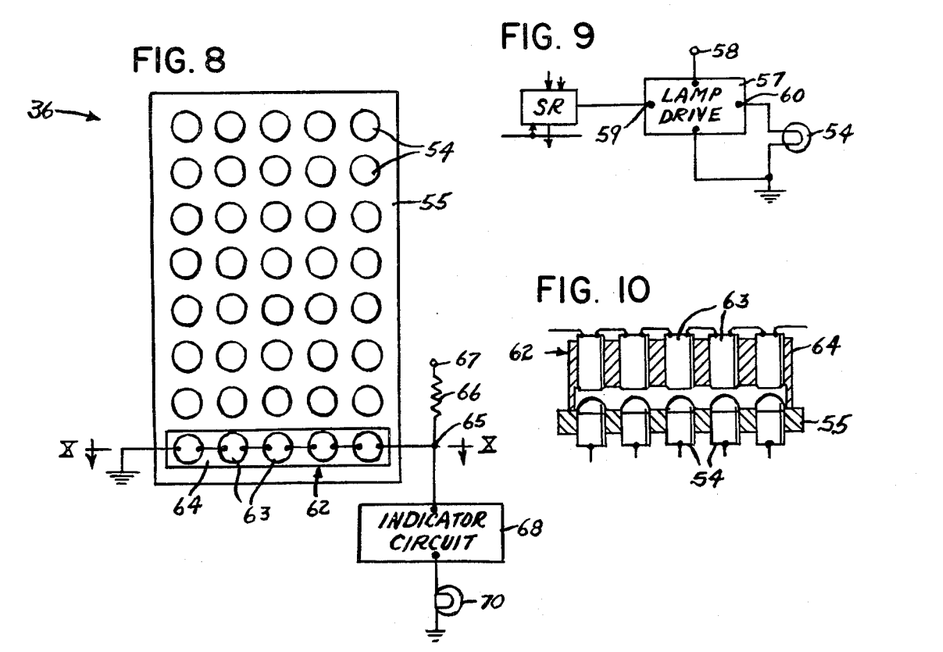
FIG. 8 is a schematic diagram of photo-electric indicating and read-out means.
FIG. 9 is a schematic diagram of a lamp energizing circuit.
FIG. 10 is a sectional view taken substantially along X—X of FIG. 8.

FIG. 8 illustrates one preferred form of the pattern sensing means 36. In the illustrated arrangement, 40 lamps 54 are mounted in a support plate 55 in eight rows A-H and five columns 1-5, corresponding to the electrical arrangement of the shift register stages of the second grid 38. Such lamps 54 are respectively energized from the corresponding shift register stages of the second grid 38 through circuits each of which, as shown in FIG. 9, may include a lamp driver circuit 57 connected to ground and a power supply terminal 58 and having an input terminal 59 connected to an output terminal of the corresponding shift register stage with an output terminal 60 connected to one terminal of the lamp 54, the other terminal of the lamp 54 being connected to ground.

With this arrangement, the lamps 54 visually indicate the manner in which signals are stored in the second grid 38 and the progress of the signals through the second grid 38 as the operation proceeds.

To detect when signals are stored in all five of the H stages, so as to detect a longitudinal defect, a photoelectric detector 62 is provided which comprises five resistive photocells 63 carried by a support 64 to be aligned with the lamps in the H row. The photocells 63 are connected in series between ground and a circuit point 65 which is connected through a resistor 66 to a power supply terminal 67 which is connected to an input terminal of an indicator circuit 68 having an output connected to an indicating lamp 70. When all five of the lamps of the H row are energized, a signal is applied to the indicator circuit 68 such as to cause the lamp 70 to be energized. The arrangement thus operates as a coincidence circuit.

With this arrangement, the lamp 70 will be energized in response to any longitudinally extending flaw having a length equal to the length of five indexing movements, regardless of the position of the longitudinal flaw within the weld 14. It will be understood that indicating means other than the lamp 70, such as audible signal devices, marking devices or the like may be used.

Figure 11:
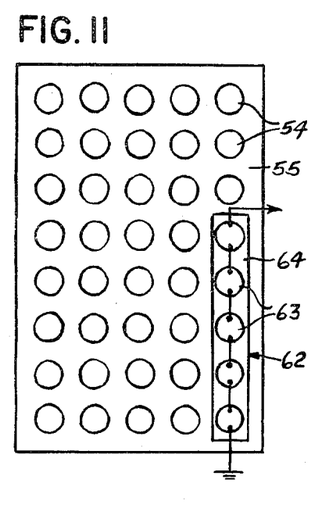
FIG. 11 is a view similar to FIG. 8, showing an alternative position of photo-electric read-out means.

An important feature of the arrangement is that it is highly versatile and can be used to detect flaws having various configurations. FIG. 11 illustrates how the photo-electric detector 62 may be positioned to align the photocells 63 with the D-5, E-5, F-5, G-5 and H-5 signal lamps. With this arrangement, a vertical defect can be detected having a certain length and regardless of its position in the weld. It will be noted that due to the horizontal shifting of the signals as they are entered into the first grid 37 and due to the transfer thereof to the second grid 38 and the subsequent downward transfer in the second grid 38, the signals from any vertical defect will always reach the last five stages of column 5, regardless of the position in the weld.

Figure 12:
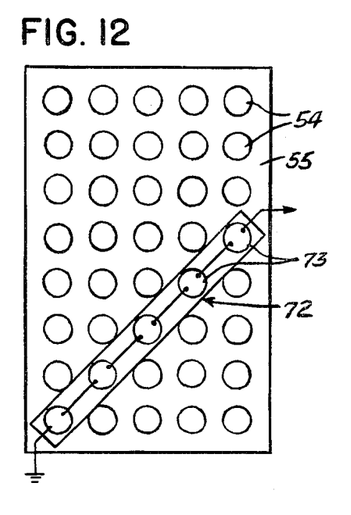
FIG. 12 is another view similar to FIG. 8, showing another alternative position of photo-electric read-out means.

FIG. 12 illustrates an arrangement for detecting an angularly extending flaw, using a photo-electric detector 72 similar to the detector 62 but having photocells 73 spaced a greater distance apart so that they can be aligned with five lamps H-1, G-2, F-3, E-4 and D-5 extending at an angle. It will be noted that with the horizontal and vertical shifting operations as above described, any flaw extending at the proper angle and having the proper length will cause simultaneous energization of the lamps opposite the photocells 73 at a certain point in the operation, regardless of the position of the flaw within the weld.

It will be understood that the lamps can be positioned to detect flaws which do not extend in a straight line, such as V-shaped flaws or flaws occupying a given area of a round, oval, rectangular or other shape. The versatility of the arrangement in this respect is highly important because defects having a certain configuration may be quite serious in certain types of parts while defects of other configurations might not be objectionable even though comparatively large in size.

Figure 13:
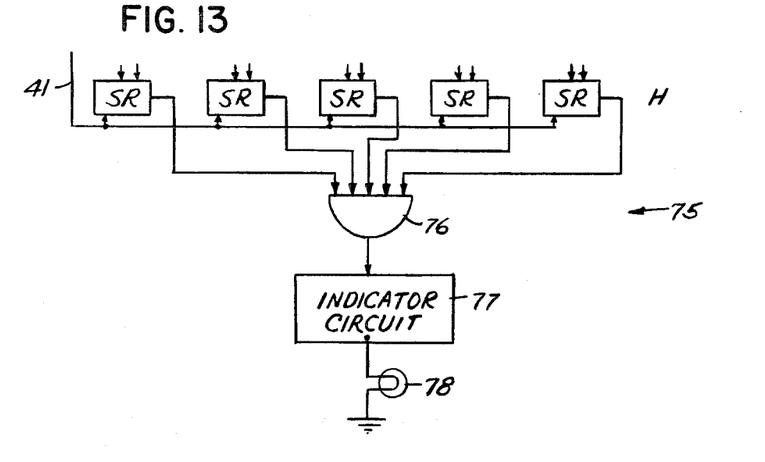
FIG. 13 is a schematic diagram of electronic read-out means.

FIG. 13 illustrates a modified type of pattern sensing means, generally designated by reference numeral 75. In this arrangement, the outputs of a number of shift register stages of the second grid 38, such as the outputs of the five H stages, are connected to inputs of an AND gate 76, the output of which is connected to the input of an indicator circuit 77 having an output connected to a lamp 78. It will be understood that the inputs of the AND gate 76 may be connected to the outputs of appropriate shift register stages to detect any pattern having a certain configuration, in a manner similar to the physical location of photocells as previously described.

Figure 14:
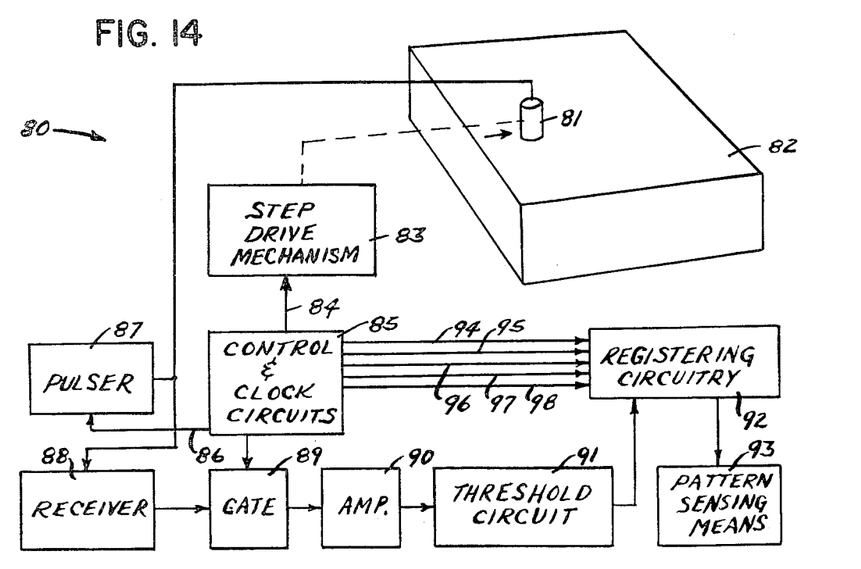
FIG. 14 is a schematic diagram of an ultrasonic testing system similar to that shown in FIG. 1, but operative in a B-scan mode rather than a C-scan mode.

FIG. 14 illustrates a modified arrangement, operable in a B-scan mode. In this arrangement, which is generally designated by reference numeral 80, a transducer 81 is moved over a part 82 to be inspected, preferably with both the transducer 81 and the part 82 immersed to provide good ultrasonic coupling. The transducer 81 is moved by a drive mechanism 83 which may be a step drive mechanism similar to the step drive mechanism 17, although continuous motion may be used if desired. The drive mechanism 83 is controlled through a line 84 from a control and clock circuit 85 which controls, through a line 86, a pulser 87 connected to the transducer 81. The transducer 81 is pulsed to transmit a burst of ultrasonic energy into the part. The energy is reflected back by flaws within the part 82 to develop echo signals in the transducer 81 which are applied through a receiver 88, a gate circuit 89, an amplifier 90 and a threshold circuit 91 to registering circuitry 92 connected to pattern sensing means 93, as diagrammatically illustrated. The registering circuit 92 is controlled from the control and clock circuit 85, through lines 94-98, corresponding to the lines 31-35 connected to the registering circuitry 28. The gate circuit 89 is controlled from the control and clock circuit 85, as indicated.

Figure 15:
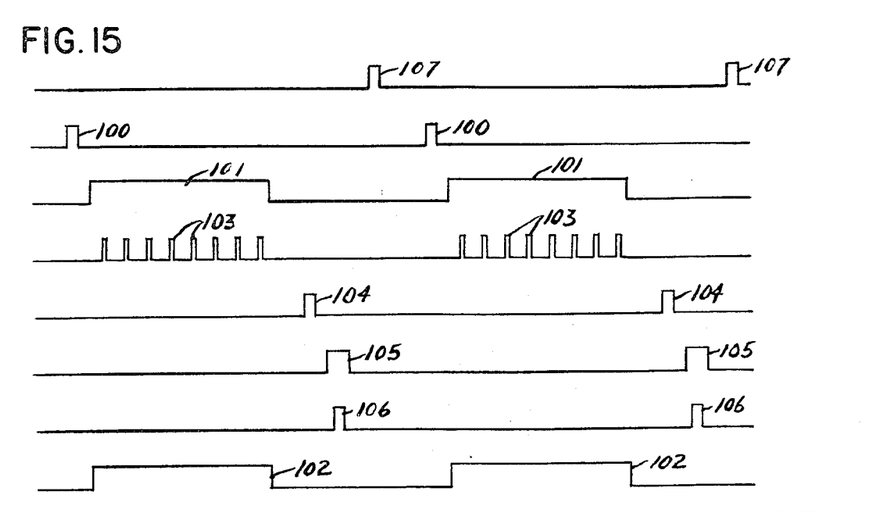
FIG. 15 is a diagram showing the timing of signals in the operation of the system of FIG. 14.

FIG. 15 illustrates the timing of signals in the operation of the system 80. A pulse 100 is applied to the pulser 87 through the line 86 to cause transmission of a burst of ultrasonic energy into the part 82. At a certain time after transmission of the burst, a gate signal is applied to the gate circuit 89 through the line 99 to allow transmission of received echo signals through the gate circuit 89, the amplifier 90 and the threshold circuit 91 to the registering circuitry 92 which may preferably be substantially the same as the registering circuitry 28, the echo signals being applied to the H-INPUT stage of the first grid corresponding to the grid 37. At the same time, a similar gate control signal 102 is applied through the line 98 to a gate corresponding to the gate 43 of the circuitry 28. Next a series of eight clock pulses 103 are applied through the line 94, corresponding to the line 31, to effect transfer of signals in the input column of the first grid and in all columns of the second grid. The clock pulses 103 are timed to correspond to predetermined depths in the part. Thus the first pulse may correspond to a depth of 1 inch, the second pulse to a depth of 1.25 inches, the third pulse to a depth of 1.5 inches and so on. The final pulse corresponding to a pulse of 2.75 inches as predetermined. Thus information is stored in the input column of the first grid corresponding to progressive depth ranges within the part 82.

Next, a clock pulse 104 is applied to the stages of columns 1–5 of the first grid, through line 95, corresponding to the line 32, to shift information from one column to another in the first grid.

A gate signal is then applied through line 96, corresponding to line 33, to parallel transfer circuit of the circuitry 91 while a clock pulse 106 is applied through line 97, corresponding to line 34, to effect transfer of information from the stages of columns 1–5 of the first grid to the corresponding stages of the second grid.

Finally, a step pulse 107 is applied through line 84 to the mechanism 83 to move the transducer 81 a certain distance relative to the part 82, in a direction parallel to the surface thereof and transverse to the axis of the beam. Another operation is then initiated by application of another pulse 100 to the pulser 87.

The system 80 thus operates in a manner quite similar to that of the system 10, except that a B-scan mode is used rather than a C-scan mode.

It is noted that the B-scan system 80 of FIG. 14 can be readily combined with a system such as the system 10, to obtain combined B-scan and C-scan indications.

It is noted further that although the shift register stages in the grids of the illustrated system are arranged in five columns and eight rows, the number can be changed, either increased or decreased, in accordance with the resolution desired. Also, although the shifting of signals in the grids of the illustrated systems takes place in synchronism with the scanning operation, which is desirable in many applications, the shifting of signals for the purpose of pattern sensing can be performed independently of the scanning, with suitable means being provided for storing information obtained from the scanning operation.

It will be understood that other modifications and variations may be effected without departing from the spirit and scope of the novel concepts of this invention.

We claim as our invention:

1. In a system for non-destructive testing of a test piece for inhomogeneities therein, scanning means arranged to effect scanning of a region of the part in first and second directions generally transverse to each other to develop signals indicating inhomogeneities therein, said scanning being performed in successive generally parallel scans in said first direction with each scan in said first direction being displaced in said second direction from the preceding scan in said first direction, a matrix of shift register stages arranged electrically in rows and columns, information entering means operable in synchronism with said scanning means for entering said inhomogeneities indicating signals into said matrix to be stored in patterns having configurations and positions corresponding to the configurations and positions of inhomogeneities in said region of the test piece, each of said columns corresponding to a scan in said first direction, and the row positioned within each column corresponding to the position of the inhomogeneities in the corresponding scan in said first direction, and pattern sensing means for sensing coincidence of storage of information in predetermined ones of said shift register stages.

2. In a system as defined in claim 1, said pattern sensing means comprising lamps associated with said predetermined ones of shift register stages to be energized in accordance with information stored therein, and photo-electric cells for detecting energization of said lamps.

3. In a system as defined in claim 1, said pattern sensing means comprising an AND logic circuit.

4. In a system as defined in claim 1, said information entering means comprising means operative during each scan in said one direction for entering information into the shift register stages of an input column of said matrix, and means operative between scans in said one direction for shifting information from the stages of each column into the stages of a next column in corresponding row positions.

5. In a system as defined in claim 1, said scanning means comprising ultrasonic transducer means, first means for effecting relative movement between said transducer means and the part to effect scanning in said first direction, and second means for effecting relative movement between said transducer means and the part to effect scanning in said second direction.

6. In a system as defined in claim 1, said scanning means comprising ultrasonic transducer means for transmitting bursts of ultrasonic energy into the part and for developing echo signals from energy reflected from inhomogeneities in the part with the scanning in said first direction being effected by measuring the timing of echo signals relative to the transmission of said bursts, and means for effecting relative movement between said transducer means and the part to effect scanning in said second direction.

7. In a system for non-destructive testing of a test piece for inhomogeneities therein, scanning means arranged to effect scanning of a region of the part in first and second directions generally transverse to each other to develop signals indicating inhomogeneities therein, said scanning being performed in successive generally parallel scans in said first direction with each scan in said first direction being displaced in said second direction from the preceding scan in said first direction, a first matrix of shift register stages arranged electrically in rows and columns, information entering means operable in synchronism with said scanning means for entering said inhomogeneity indicating signals into said matrix to be stored in patterns having configurations and positions corresponding to the configurations and positions of inhomogeneities in said region of the test piece, each of said rows corresponding to a scan in said first direction, and the row positioned within each column corresponding to the position of the inhomogeneities in the corresponding scan in said first direction, a second matrix of shift register stages arranged electrically in rows and columns corresponding to rows and columns of said first matrix, parallel transfer means operable in synchronism with said scanning means for transferring information stored in said shift register stages of said first matrix to corresponding shift register stages of said second matrix, and pattern sensing means for sensing coincidence of storage of information in predetermined ones of said shift register stages of said second matrix.

8. In a system as defined in claim 7, means for transferring information from one row to another in said second matrix.

9. In a system as defined in claim 8, said transfer of information from one row to another in said second matrix being effected in synchronism with the entry of information into said input column of said first matrix.

10. In a system as defined in claim 7, said pattern sensing means comprising lamps associated with said predetermined ones of said shift register stages of said second matrix to be energized in accordance with information stored therein, and photoelectric cell for detecting energization of said lamps.

11. In a system as defined in claim 7, said pattern sensing means comprising AND logic circuitry connected to said predetermined ones of said shift register stages of said second matrix.

* * * * *